M. C. CHAMBERLIN.
Whiffletree.
No. 62,814. Patented Mar. 12, 1867.
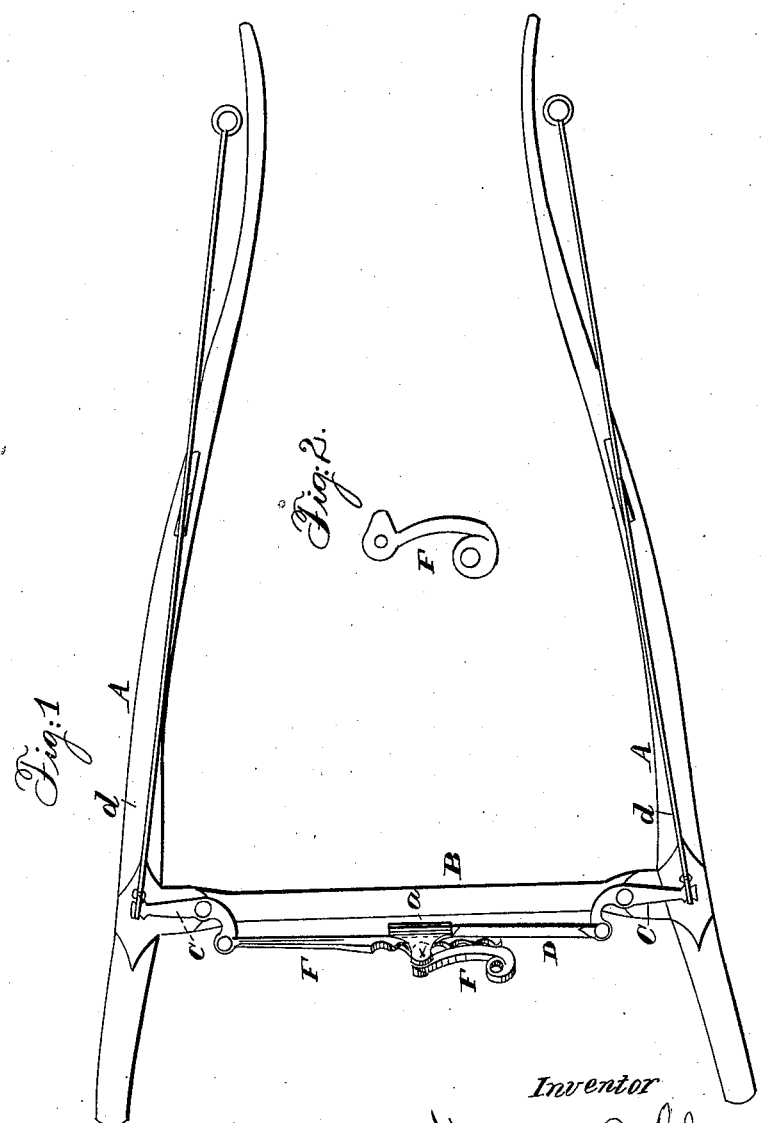

United States Patent Office.

MELVIN C. CHAMBERLIN, OF PLAINVIEW, MINNESOTA.

Letters Patent No. 62,814, dated March 12, 1867.

IMPROVEMENT IN WHIFFLE-TREES.

The Schedule referred to in these Letters Patent and making part of the same.

TO ALL WHOM IT MAY CONCERN:

Be it known that I, MELVIN C. CHAMBERLIN, of Plainview, in the county of Wabashaw, and in the State of Minnesota, have invented certain new and useful additional improvements in "Whiffle-Trees;" and do hereby declare that the following is a full, clear, and exact description thereof, reference being had to the accompanying drawings, and to the letters of reference marked thereon.

In the annexed drawings, A represents the shafts of a vehicle of any kind, and B the cross-piece connecting them near their rear ends, and to which the whiffle-tree is usually attached. C C represent two metallic bars, made in the form shown, and pivoted to the cross-piece B or its upper side, and near its ends. The outer ends of these bars are provided with notches similar to those upon the end of the common whiffle-tree for securing the end of the tug or trace. The inner ends of these bars curve back of the bar B, as seen, and are pivoted to the outer ends of the bars D and E. D and E represent two bars, made of metal, which lie back of cross-piece B. The bar D is provided on its inner end with a metallic box, $a$, open at both ends, and also with a lever, F, which is so pivoted to it that the inner end of the lever is within the box or without, according to the position it is placed in. The bar E is provided with a series of notches or teeth, as represented, and passes into the box $a$ upon bar D. After pushing or inserting the end of bar E within the box $a$ the lever F is turned down, as seen, fig. 1, and its end catches between the notches or teeth on bar E and holds it in position. By raising this lever the bar may be drawn out one or more notches or out altogether, or secured in any desired position. When the traces are secured to the ends of the bars C C they have the usual oscillating motion of whiffle-trees, derived from the motion of the horse's shoulders. The traces may be taken up or let out by shifting the bar E in box $a$. A cord may be secured to the end of lever F, and, when driving, and a horse is vicious or inclined to run away, it may be thrown up, allowing bar E to draw out of box $a$, and the traces will then slip off of bars C C, and the horse will be detached from the vehicle.

Having thus fully described my invention, what I claim as new, and desire to secure by Letters Patent, is—

The arrangement of the bars C C and D and E, constructed as described, and used in connection with the lever F and box $a$, substantially as and for the purpose herein specified.

In testimony that I claim the foregoing, I have hereunto set my hand and seal this twenty-sixth day of November, 1866.

M. C. CHAMBERLIN.

Witnesses:
S. N. WRIGHT,
C. H. BAXTER.